United States Patent
Dallas et al.

(10) Patent No.: US 6,477,304 B2
(45) Date of Patent: Nov. 5, 2002

(54) REINFORCED STRUCTURE FOR A CABLE OR DUCT WITH HIGH COMPRESSION RESISTANCE

(75) Inventors: George John Dallas, Hickory, NC (US); J. Boyet Stevens, Maineville, OH (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/742,222

(22) Filed: Dec. 22, 2000

(65) Prior Publication Data

US 2002/0136512 A1 Sep. 26, 2002

(51) Int. Cl.⁷ ............................... G02B 6/44
(52) U.S. Cl. ......................................... 385/110
(58) Field of Search ..................... 385/110, 111, 385/112, 113, 114, 100, 103, 105, 106, 109

(56) References Cited

U.S. PATENT DOCUMENTS

| | | | |
|---|---|---|---|
| 4,361,381 A | 11/1982 | Williams | 385/105 |
| 4,784,461 A | 11/1988 | Abe et al. | 385/112 |
| 5,039,197 A | 8/1991 | Rawlyk | 385/102 |
| 5,177,809 A * | 1/1993 | Zeidler | 385/105 |
| 5,199,094 A * | 3/1993 | Schneider | 385/105 |
| 5,289,556 A | 2/1994 | Rawlyk et al. | 385/112 |
| 5,420,955 A | 5/1995 | Cooke et al. | 385/110 |
| 5,649,043 A | 7/1997 | Adams et al. | 385/110 |
| 5,689,601 A | 11/1997 | Hager et al. | 385/100 |
| 5,715,344 A | 2/1998 | Seo et al. | 385/110 |
| 5,920,672 A | 7/1999 | White | 385/110 |

* cited by examiner

Primary Examiner—Tulsidas Patel
(74) Attorney, Agent, or Firm—Sughrue Mion, PLLC

(57) ABSTRACT

A cable or duct having high compression resistance to external pressure while maximizing the space available for the optical fibers or wires therein. The optical fiber cable or duct includes an outer jacket having a substantially tubular shape, a compression resistant core member disposed longitudinally in the outer shell and a central strength member extending through the compression resistant core member. The core member includes a plurality of Y-shaped rib members extending radially therefrom to the outer shell. A plurality of cavities are defined between the rib members for receiving the optical fibers. The Y-like shape of the reinforcement ribs maximizes the compressive strength of the cable while minimizing the amount of material used for the reinforcement member. Thus, there is more space for the optical fibers in the cable or more cables in the duct.

18 Claims, 6 Drawing Sheets

REINFORCED STRUCTURE FOR A CABLE OR DUCT WITH HIGH COMPRESSION RESISTANCE

BACKGROUND OF THE INVENTION

1. Field of the Invention

The present invention relates to an optical fiber cable or duct and more particularly to such a cable or duct having an internal reinforcing member(s) for protecting the fibers from external compressive forces.

2. Discussion of Related Art

It is preferred that fiber optic cables or ducts have high compression resistance to external pressure so that the optical fibers located therein are protected from outside forces. To accomplish this objective, it is known to provide a longitudinally extending spacer member having recesses around the circumference in which the fibers are received. In U.S. Pat. No. 5,289,556, the spacer includes a crush resistant material 4 surrounding a strength member 24. The core 22 has a spoke-like configuration with the recesses being defined between each of the spokes. U.S. Pat. No. 5,920,672 discloses a similar space arrangement with a spoke-like members have a triangular-like configuration.

The problem with these prior art arrangements is that considerable material is used to form the spacer. Thus, the spacer consumes a significant amount of space inside the cable, thus reducing the amount of optical fibers that can be placed in the cable.

SUMMARY OF THE INVENTION

An object of the present invention is to provide fiber optical cable or duct having high compression resistance to external pressure while maximizing the space available for the optical fibers. The optical fiber cable or duct includes an outer jacket having a substantially tubular shape, a compression resistant core member disposed longitudinally in the outer shell and a central strength member extending through the compression resistant core member. The core member includes a plurality of Y-shaped rib members extending radially therefrom to the outer shell. A plurality of cavities are defined between the rib members for receiving the optical fibers.

According to the invention, central strength member can be made of plastic, metal, or a fiber reinforced thermoplastic or thermoset material. Further, the compression resistant core and the associated ribs can be made of either a thermoplastic or thermoset.

The unique Y-like shape of the reinforcement ribs maximizes the strength of the cable while minimizing the amount of material used for the reinforcement member. Thus, there is more space for the optical fibers. The Y shaped region can either be manufactured with the "V section" open or, alternatively, filled with a plastic material. The filled form would resemble a radial member with a fillet or radiused region where it joins the circumference.

According to another embodiment of the present invention, the optical fibers are held in buffer tubes or are arranged in a ribbon. The cable can also be used to house electrical conductors.

BRIEF DESCRIPTION OF THE DRAWINGS

The above and other objects and advantages of the present invention will become more apparent by describing in detail the preferred embodiments thereof with reference to the accompanying drawings, wherein.

DETAILED DESCRIPTION OF THE INVENTION

Figure 1:
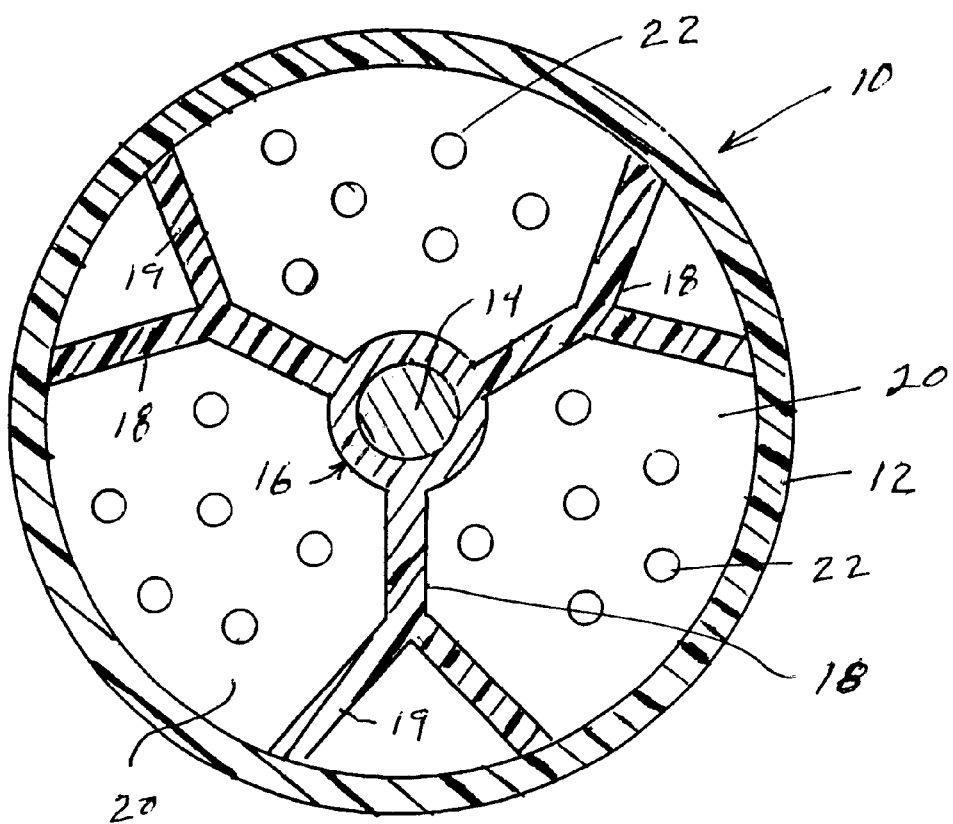
FIG. 1 is a cross-sectional view of a cable according to a first embodiment of the present invention in which optical fibers are provided in a cable.

FIG. 1 illustrates an optical fiber cable 10 according to a first embodiment of the invention. The cable 10 includes an outer jacket 12, a central strength member 14 and a reinforcing core 16. The strength member 14 and the reinforcing core 16 extend longitudinally in the cable to provide strength to the cable.

According to the present invention, the reinforcing core 16 includes a plurality of radially extending ribs 18 having a Y-shaped configuration so as to include a pair of legs 19 which extend to the outer jacket 12. The ribs 18 prevent the cable 10 from collapsing when subjected to outside forces and divide the cable 10 into individual chambers 20, extending the length of the cable, in which the optical fibers 22 are received. The location of the Y joint where the legs 19 branch out from the ribs 18 can vary, depending on the size and shape of the chambers desired.

In the illustrated embodiment, there are three chambers 20. However, the invention is naturally not limited in this respect as there could be any number of chambers. The strength of the cable increases with an increased number of ribs 18 when the ribs are of a particular size. The ribs 18 may extend strictly in an axial direction along the cable or at an angle to the core axis. This angle may be produced either by the ribs extending helically or sinusoidally along the core.

Figure 2:
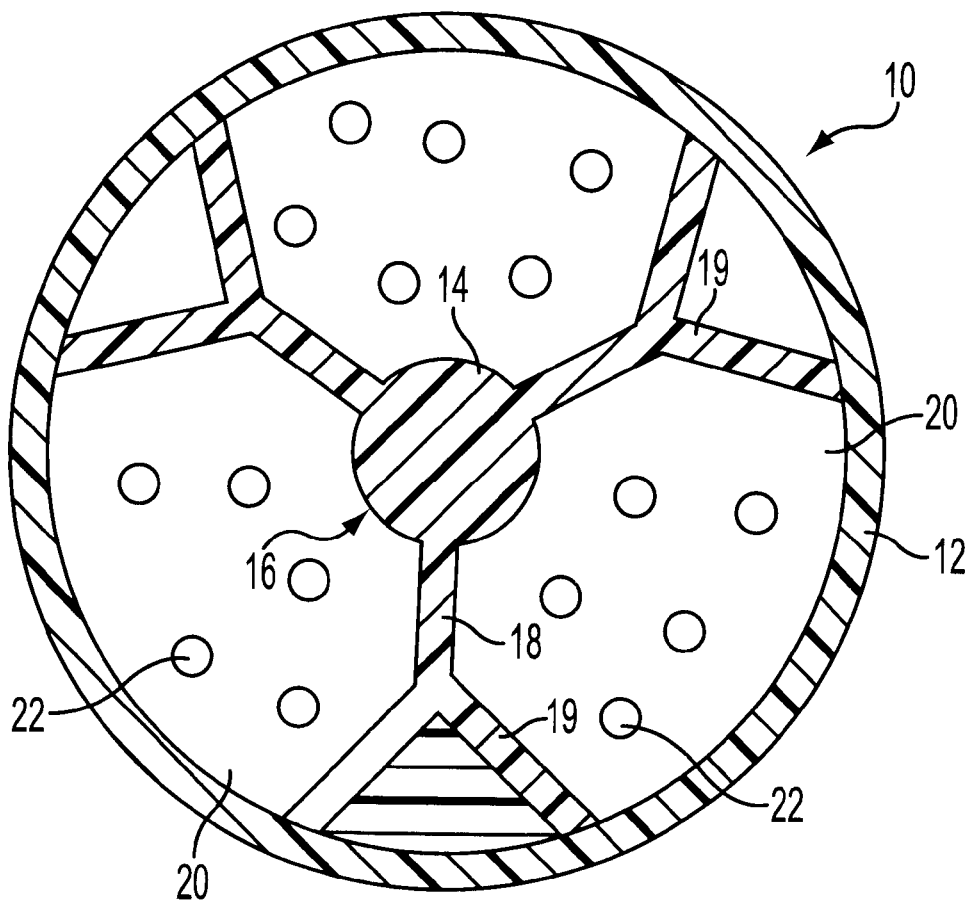
FIG. 2 is a cross-sectional view of an optical fiber cable according to a second embodiment of the present invention wherein the reinforcing structure is one-piece.

The central strength member 14 and the reinforcing core 16 can be made of either metal, plastic or a fiber reinforced thermoplastic or thermoset material. In the embodiment illustrated in FIG. 1, the central strength member is made of metal and the reinforcing core 16 is made of plastic. This can be accomplished by extruding the reinforcing core around the metallic strength member 14. Alternatively, as illustrated in FIG. 2, the central strength member 14 and the reinforcing core 16 can be extruded together from a plastic material such as a high density polyethylene to form a one-piece structure.

The outer jacket 12 is likewise made of plastic of any suitable material such as polyethylene and may or may not have axial reinforcing members therein. Although not shown, if desirable, a binding tape may be wrapped around the reinforcing core 16 to secure the fibers 22 within their respective chambers 20 during the manufacturing process. In addition, a metal sheath may be provided around the reinforcing core to provide added protection. Although described separately, the jacket and the inner core components could be extruded as a one piece structure. For example, the reinforcing core 16 and the associated ribs 18 could be extruded with the jacket 12 as a one-piece structure to thereby simplify the manufacturing.

Figure 3:
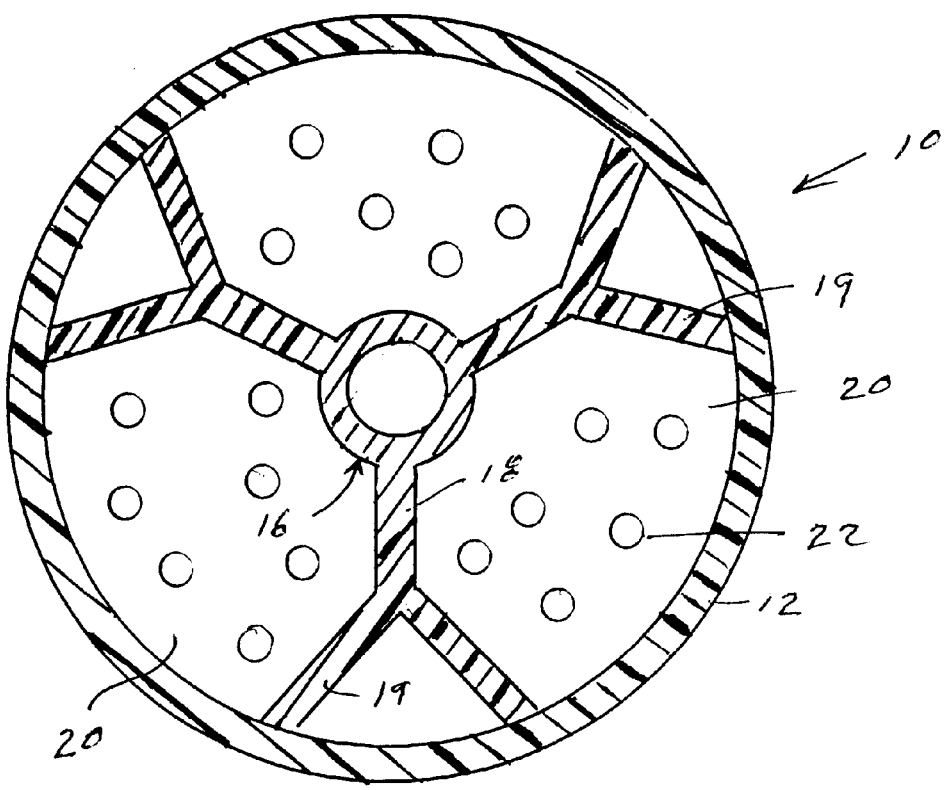
FIG. 3 is a cross-sectional view of a cable according to a third embodiment of the present invention in which the central strength member is omitted.

FIG. 3 illustrates another embodiment of the present invention. This embodiment differs from the first embodiment in that the central strength member 14 is eliminated. In addition, the opening defined by the V-shape portion of the ribs may alternatively be filled with a plastic material, such as a fiber-reinforced plastic material.

Figure 4:
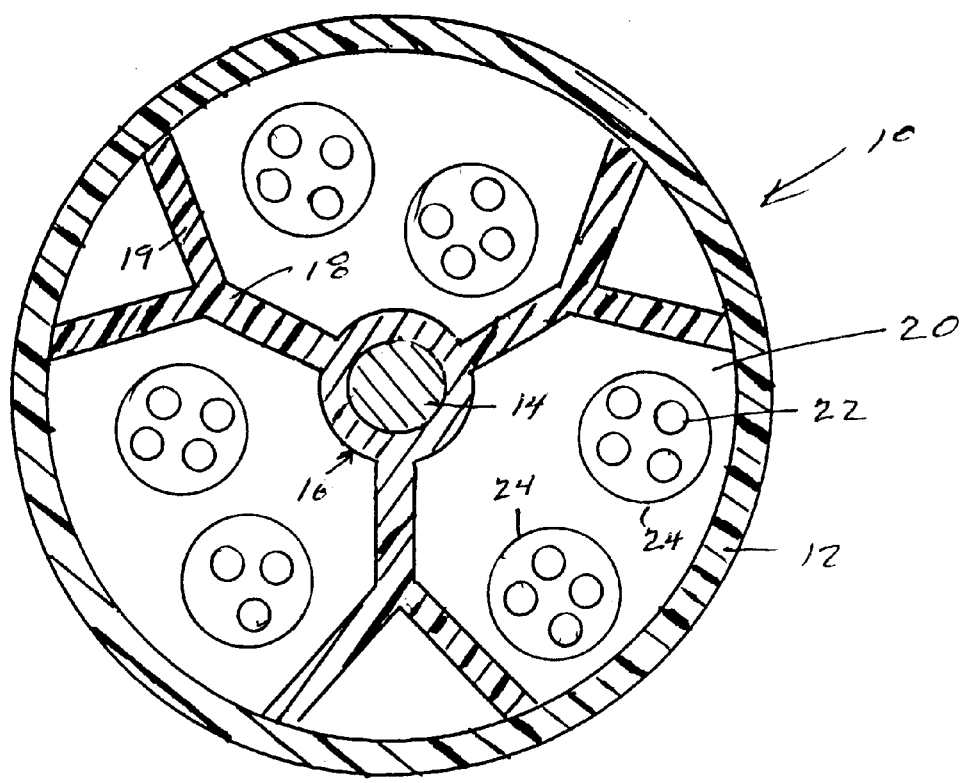
FIG. 4 is a sectional view of a cable according to a fourth embodiment of the present invention in which optical fibers are located within buffers tubes provided in the cable.
Figure 5:
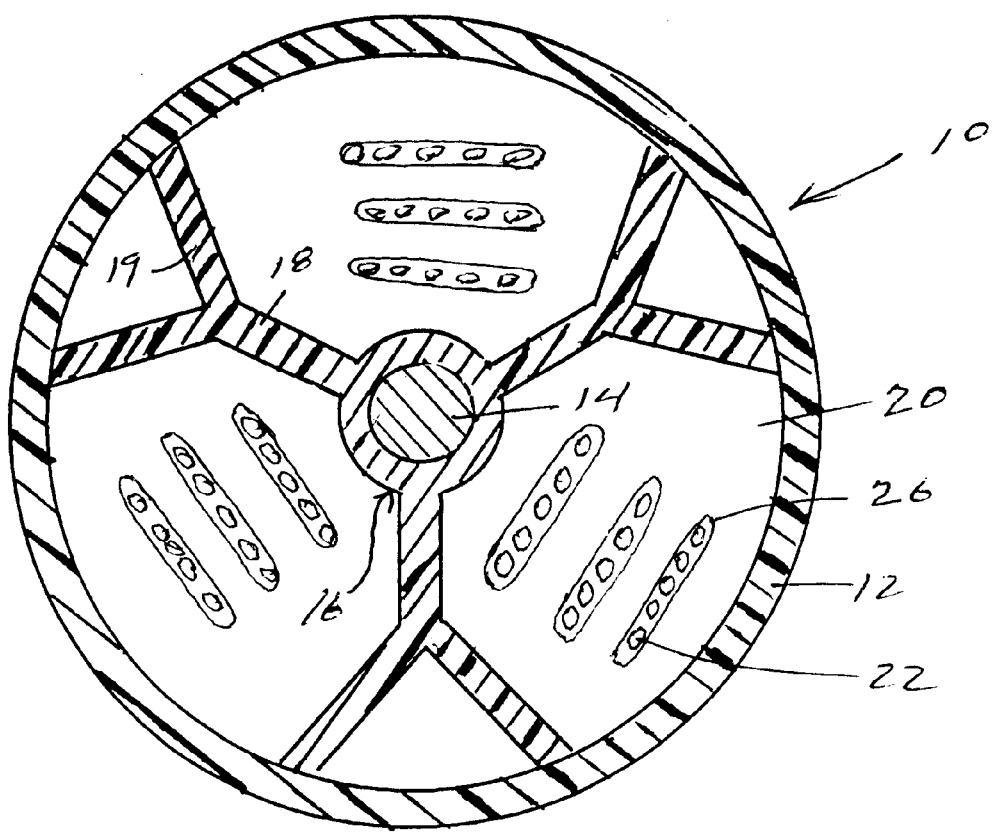
FIG. 5 is a sectional view of a cable according to a fifth embodiment of the present invention in which optical fiber ribbons are provided in the cable.
Figure 6:
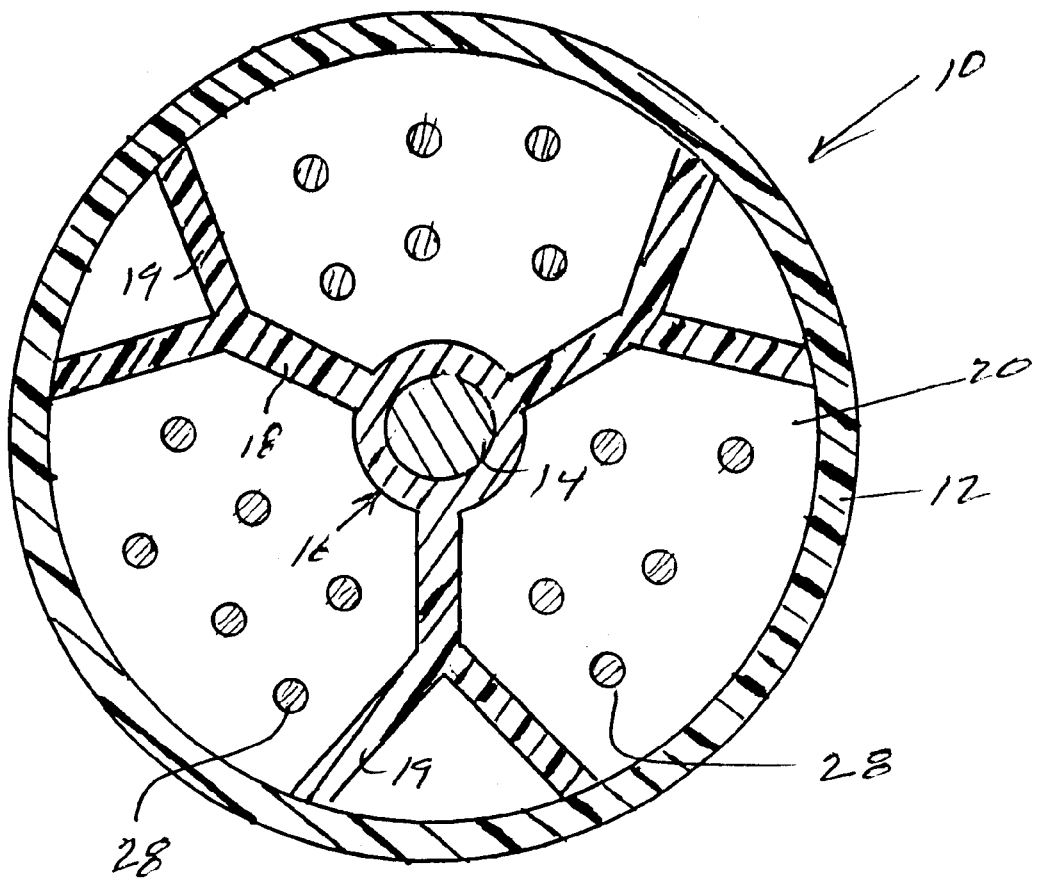
FIG. 6 is a cross-sectional view of a cable according to yet a further embodiment of the present invention wherein electrical conductors are provided in the cable.

FIGS. 4–6 illustrate additional embodiments of the invention in which the cable includes (1) buffer tubes 24 having optical fibers 22 therein (FIG. 4); (2) optical fiber ribbons 26 in which the optical fibers 22 are arranged in a ribbon-like manner (FIG. 5); and electrical conductors 28 (FIG. 6).

The cable of the present invention provides advantages over the conventional cable in that the reinforcing core provides superior strength with a minimum amount of material so that the chambers for receiving the optical fibers and/or electrical conductors is maximized.

Persons of ordinary skill in the art will understand that the foregoing embodiments of the present invention are intended to be illustrative rather than limiting. Moreover, persons of ordinary skill in the art will understand that variations can be made to the present invention without departing from the scope of the appended claims. For example, although the preferred embodiment has been described with respect to an optical fiber cable, the present invention is equally applicable to optical fiber ducts.

We claim:

1. A tubular conduit having high compression resistance, comprising:

an outer jacket; and a compression resistant member disposed longitudinally in said outer jacket, said compression resistant member including a plurality of Y-shaped ribs defining chambers therebetween for respectively receiving information transmission members therein, wherein each of said Y-shaped ribs includes a base leg and a pair of legs which define a recess therebetween and which directly connect to said outer jacket.

2. The tubular conduit of claim 1, wherein said compression resistant member is made of plastic.

3. The tubular conduit of claim 1, further comprising a central strength member extending along the center portion of said compression resistant member.

4. The tubular conduit of claim 3, wherein said central strength member is made of metal and said compression resistant member is made of plastic.

5. The tubular conduit of claim 1, wherein said information transmission members include optical fibers.

6. The tubular conduit of claim 5, where in s aid optical fibers are arranged in a plurality of optical fiber ribbons.

7. The tubular conduit of claim 5, wherein said transmission members include a plurality of buffer tubes each having a plurality of optical fibers.

8. The tubular conduit of claim 5, wherein said transmission members are electrical conductors.

9. The tubular conduit of claim 1, wherein said recess is filled with a plastic material.

10. The tubular conduit of claim 1, wherein said recess is filled with a fiber-reinforced thermoplastic material.

11. The conduit of claim 1, wherein said jacket and said compression resistant member are one-piece.

12. A cable, comprising:

an outer jacket;

a reinforcing core extending longitudinally in said outer jacket and including a plurality of Y-shape ribs extending radially for defining a plurality of chambers; and at least one optical fiber disposed within each of said chambers, wherein each of said Y-shaped ribs includes a base leg and a pair of legs which define a recess therebetween and which directly connect to said outer jacket.

13. A cable of claim 12, further comprising a central strength member extending through said reinforcing core.

14. The cable of claim 13, wherein said central strength member and said reinforcing core are unitary.

15. A tubular conduit having high compression resistance, comprising:

an outer jacket; and a compression resistant member disposed longitudinally in said outer jacket, said compression resistant member including a plurality of Y-shaped ribs defining chambers therebetween for respectively receiving information transmission members therein; and a central strength member extending along the center portion of said compression resistant member; wherein said central strength member is made of metal and said compression resistant member is made of plastic.

16. A tubular conduit having high compression resistance, comprising:

an outerjacket; and a compression resistant member disposed longitudinally in said outer jacket, said compression resistant member including a plurality of Y-shaped ribs defining chambers therebetween for respectively receiving information transmission members therein, wherein each of said Y-shaped ribs includes a pair of legs defining a recess therebetween, and where said recess if filled with a plastic material.

17. The tubular conduit of claim 1, wherein said compression resistant member includes a core portion defined by a central tubular member and wherein said base leg of said ribs is connected directly to said central tubular member.

18. The cable of claim 12, wherein said reinforcing core includes a core portion defined by a central tubular member and wherein said base leg of said ribs is connected directly to said central tubular member.

* * * * *